United States Patent
Onno et al.

(10) Patent No.: US 10,861,195 B2
(45) Date of Patent: Dec. 8, 2020

(54) VALENCE-BASED ENCODING AND DECODING OF CONNECTIVITY DATA IN A 3D MODEL

(71) Applicant: CANON KABUSHIKI KAISHA, Tokyo (JP)

(72) Inventors: Patrice Onno, Rennes (FR); Guillaume Laroche, Saint Aubin d'Aubigne (FR); Christophe Gisquet, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 15/990,496

(22) Filed: May 25, 2018

(65) Prior Publication Data
US 2018/0342083 A1 Nov. 29, 2018

(30) Foreign Application Priority Data
May 29, 2017 (GB) .................................. 1708539.0

(51) Int. Cl.
*G06T 9/00* (2006.01)
*G06T 17/00* (2006.01)
*G06T 9/20* (2006.01)

(52) U.S. Cl.
CPC ................ *G06T 9/001* (2013.01); *G06T 9/20* (2013.01); *G06T 17/00* (2013.01)

(58) Field of Classification Search
CPC .. G06T 9/00; G06T 9/001; G06T 9/20; G06T 17/00
See application file for complete search history.

(56) References Cited

U.S. PATENT DOCUMENTS

| | | | |
|---|---|---|---|
| 6,823,506 B1* | 11/2004 | Whitten | G06F 8/443 717/151 |
| 6,999,073 B1* | 2/2006 | Zwern | G06T 17/005 345/420 |
| 7,098,916 B1* | 8/2006 | Khodakovsky | G06T 9/001 345/418 |
| 9,532,056 B2* | 12/2016 | Jiang | H04N 19/44 |

(Continued)

OTHER PUBLICATIONS

Alliez et al. "Valence Driven Connectivity Encoding for 3D Meshes" Eurographics 2001 vol. 20 (Oct. 2001) No. 3, pp. 1-10.*

(Continued)

*Primary Examiner* — Mia M Thomas
(74) *Attorney, Agent, or Firm* — Canon U.S.A., Inc. IP Division

(57) ABSTRACT

The invention relates to the valence-based encoding of connectivity data of a 3D mesh. A command is generated for each free edge of each vertex traversed and describes the vertex at the other end of the edge. The obtained list of commands is encoded by mapping each command onto a symbol. A mapping table associating commands with a set of respective consecutive numeral symbols is used. The list of symbols is then encoded, separately to the encoding of parameters of the commands. A joint encoding may be used to encode two or more consecutive symbols using a single coding word. A look-up table may be used based on the valence values intrinsically defined by each symbol, in order to give priority to the most frequent valence values (usually around 6). Prior to generating the commands, a vertex may be added to the 3D mesh to artificially fill any hole therein.

26 Claims, 11 Drawing Sheets

(56) References Cited

U.S. PATENT DOCUMENTS

| | | | | |
|---|---|---|---|---|
| 2006/0290695 | A1* | 12/2006 | Salomie | G06T 17/20 345/420 |
| 2011/0037763 | A1* | 2/2011 | Lee | G06T 9/001 345/419 |
| 2012/0163456 | A1* | 6/2012 | Coban | H04N 19/176 375/240.13 |
| 2012/0306875 | A1* | 12/2012 | Cai | G06T 9/001 345/420 |
| 2014/0092439 | A1* | 4/2014 | Krig | G06T 9/001 358/2.1 |
| 2015/0103073 | A1* | 4/2015 | Tian | H04N 19/134 345/419 |
| 2018/0350153 | A1* | 12/2018 | Hemmer | G06T 9/00 |

OTHER PUBLICATIONS

Alliez et al, "Valence-Driven Connectivity Encoding for 3D Meshes", Computer Graphics Forum, vol. 20, Issue 3, Nov. 3, 2001, pp. 480-489, whole document particularly section 4.5.

Khodakovsky et al, "Near-Optimal Connectivity Encoding of 2-Manifold Polygon Meshes", Graphical Models, vol. 64, Feb. 23, 2002, pp. 147-168, Available from http://www.multires.caltech.edu/pubs/ircomp.pdf, whole document particularly section 3 .4.1.

Jong et al, "An efficient connectivity compression for triangular meshes", Fourth Annual ACIS International Conference on Computer and Information Science 2005, Published 2005, TEEE, pp. 583-588, whole document particularly section III.

Kalberer, et al, "FreeLence—Coding with Free Valences", pp. 469-478,"Computer Graphics forum", Eurographics, vol. 24, Issue 3, Published 2005, Available from http://www.mi.fu-berlin.de/en/math/groups/aggeom/publications/db/freelence.pdf, whole document particularly section 2.4.

* cited by examiner

```
ply
format ascii 1.0
comment zipper output
element vertex 12
property float x
property float y
property float z
element face 18
property list uchar int vertex_indices
end_header
```
```
5.0  3.0  1.0   (V₀)
8.0  8.0  0.0   (V₁)
6.0  6.0  2.0   (V₂)
4.0  6.0  2.0   (V₃)
2.0  8.0  0.0   (V₄)
2.0  0.0  0.0   (V₅)
8.0  0.0  0.0   (V₆)
8.0  9.0 -3.0   (V₇)
8.0 10.0  0.0   (V₈)
2.0 10.0  0.0   (V₉)
2.0  9.0 -3.0   (V₁₀)
5.0  9.0 -3.0   (V₁₁)
```
```
3 0 1 2   (F₀)
3 0 2 3   (F₁)
3 6 7 1   (F₂)
3 1 7 8   (F₃)
3 1 8 4   (F₄)
3 4 8 9   (F₅)
3 9 10 4  (F₆)
3 10 5 4  (F₇)
3 0 4 5   (F₈)
3 0 3 4   (F₉)
3 0 5 6   (F₁₀)
3 0 6 1   (F₁₁)
3 9 8 11  (F₁₂)
3 8 7 11  (F₁₃)
3 9 11 10 (F₁₄)
3 10 11 5 (F₁₅)
3 7 6 11  (F₁₆)
3 6 5 11  (F₁₇)
```

```
ply
format ascii 1.0
comment zipper output
element vertex 13
property float x
property float y
property float z
element face 22
property list uchar int vertex_indices
end_header
```
```
5.0  3.0  1.0
8.0  8.0  0.0
6.0  6.0  2.0
4.0  6.0  2.0
2.0  8.0  0.0
2.0  0.0  0.0
8.0  0.0  0.0
8.0  9.0 -3.0
8.0 10.0  0.0
2.0 10.0  0.0
2.0  9.0 -3.0
5.0  9.0 -3.0
5.0  7.0  1.0   (V₁₂)
```
```
3 0 1 2
3 0 2 3
3 6 7 1
3 1 7 8
3 1 8 4
3 4 8 9
3 9 10 4
3 10 5 4
3 0 4 5
3 0 3 4
3 0 5 6
3 0 6 1
3 9 8 11
3 8 7 11
3 9 11 10
3 10 11 5
3 7 6 11
3 6 5 11
3 12 3 2   (F₁₈)
3 12 1 4   (F₁₉)
3 12 2 1   (F₂₀)
3 12 4 3   (F₂₁)
```

Fig. 3b

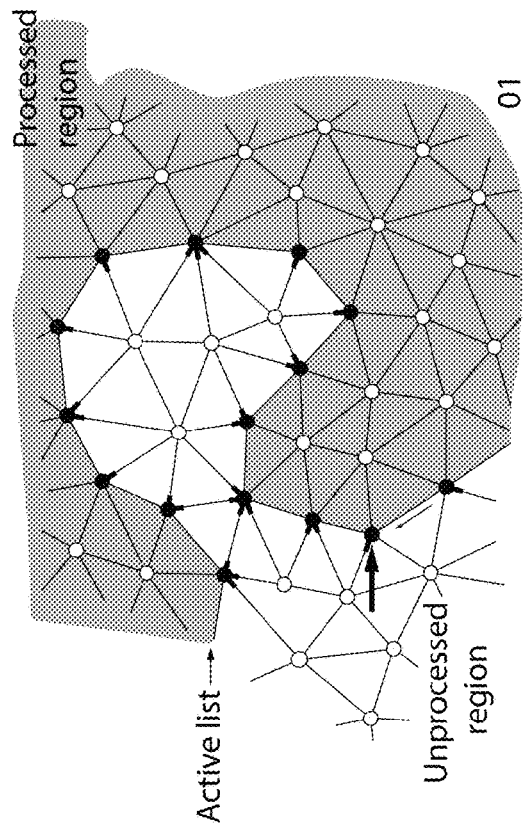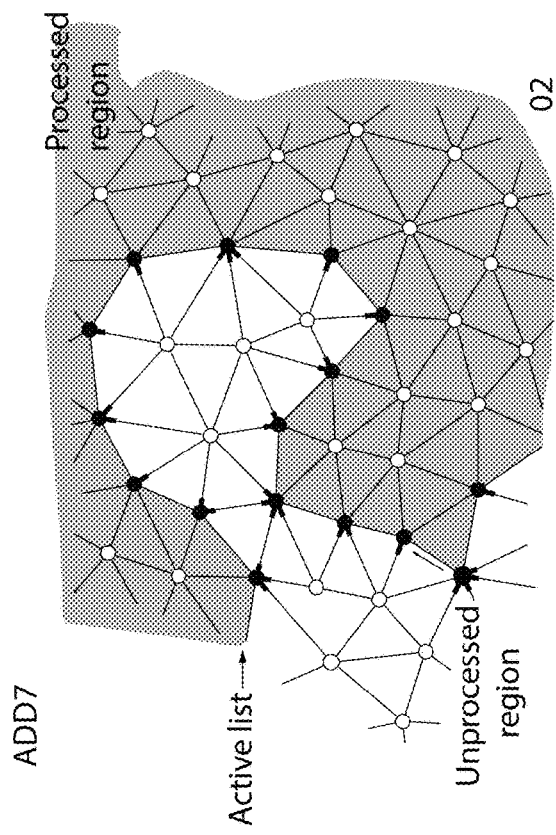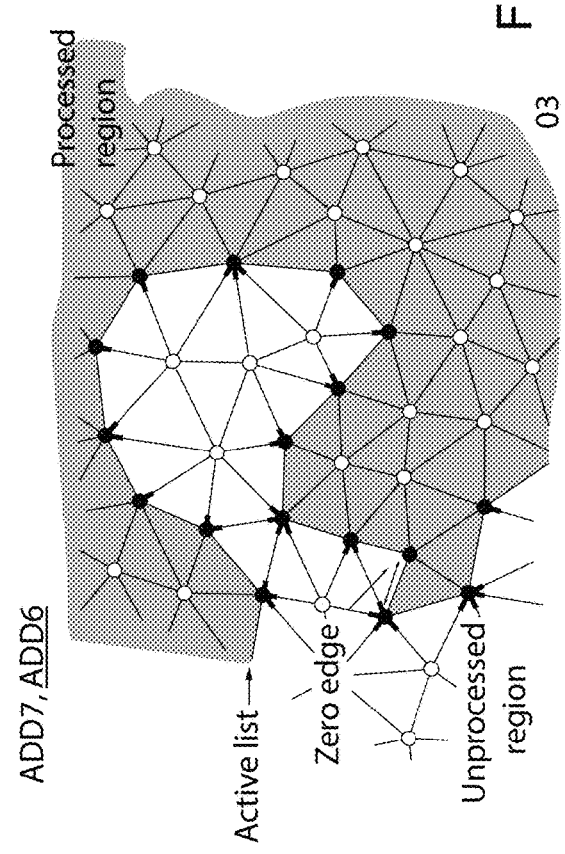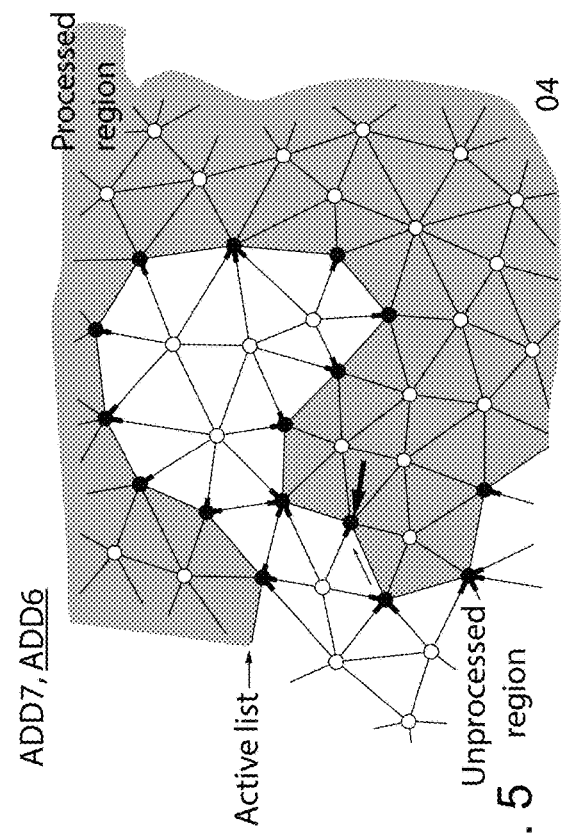
Fig. 5

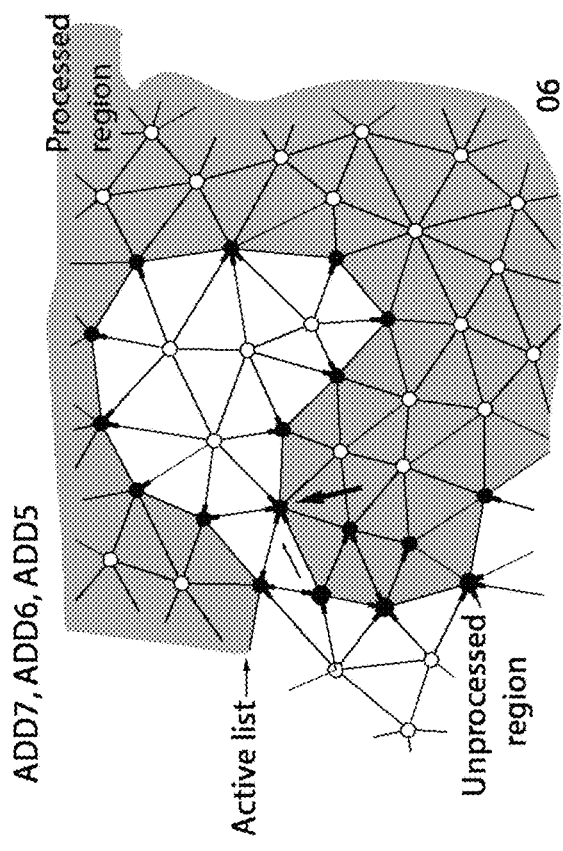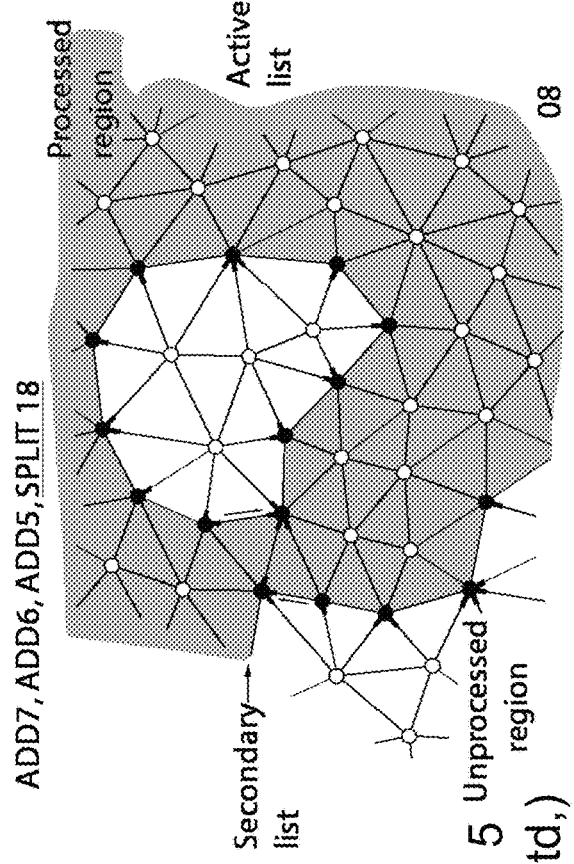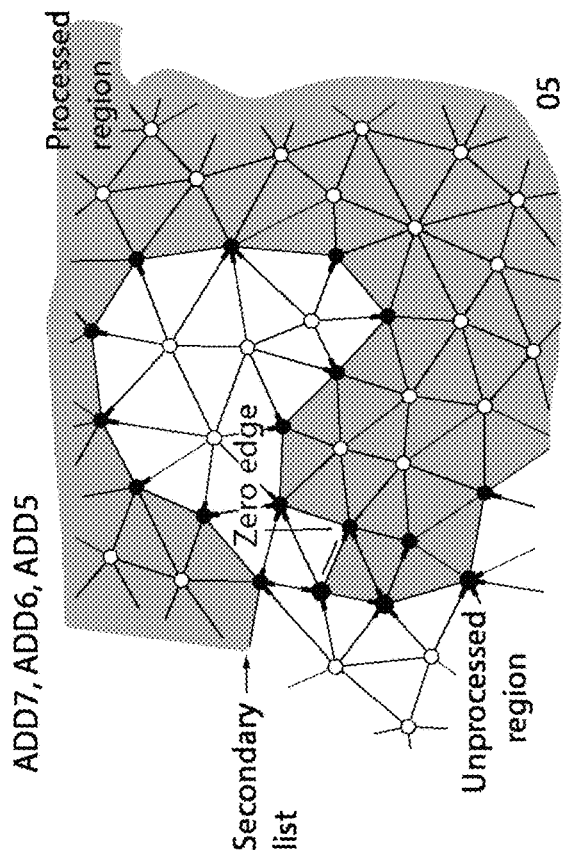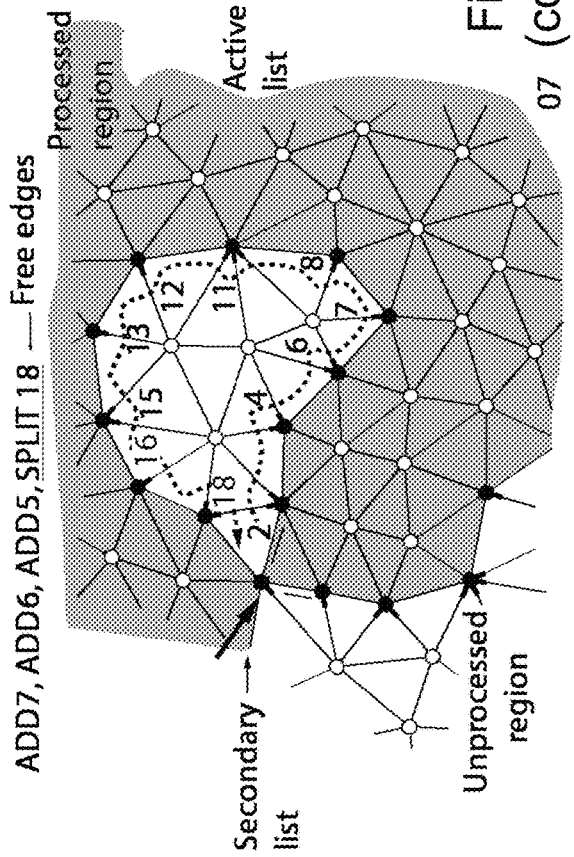
Fig. 5 (contd.)

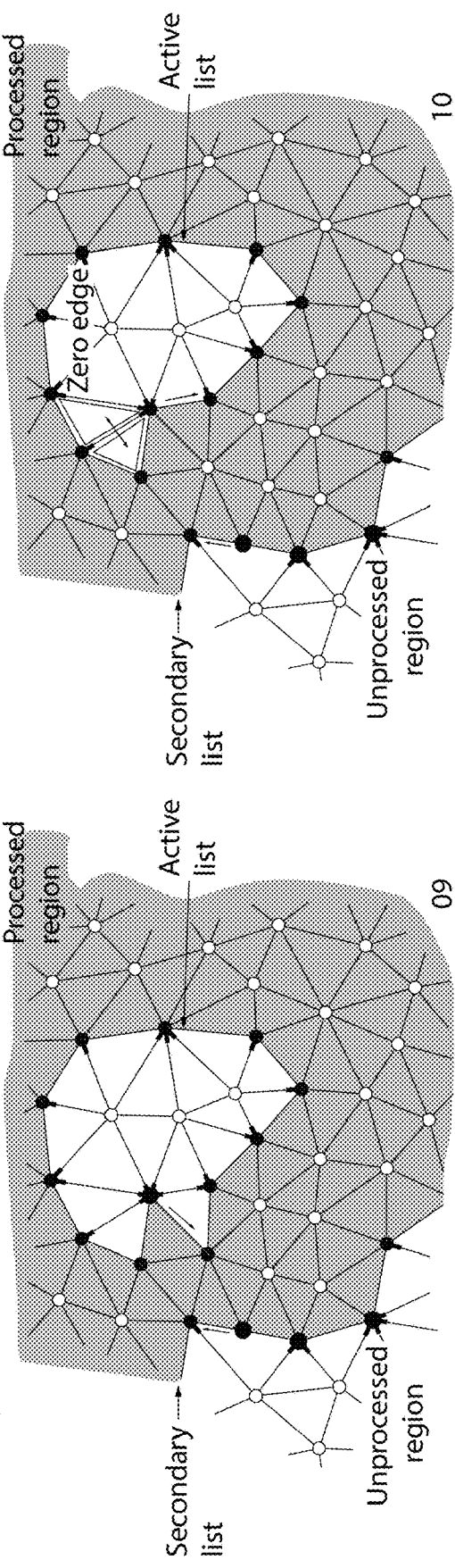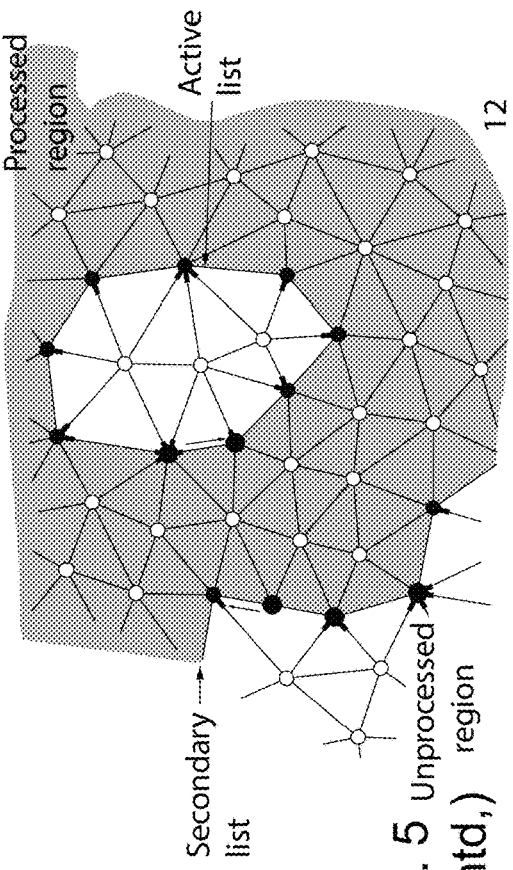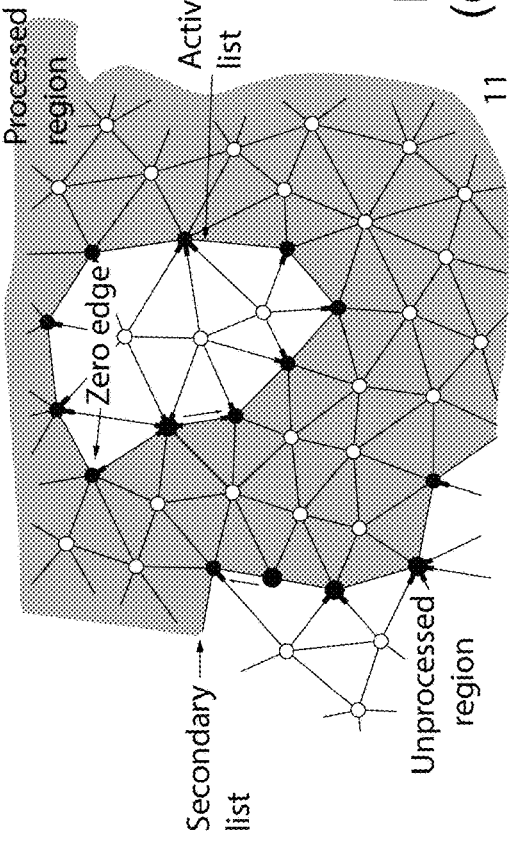
Fig. 5 (contd.)

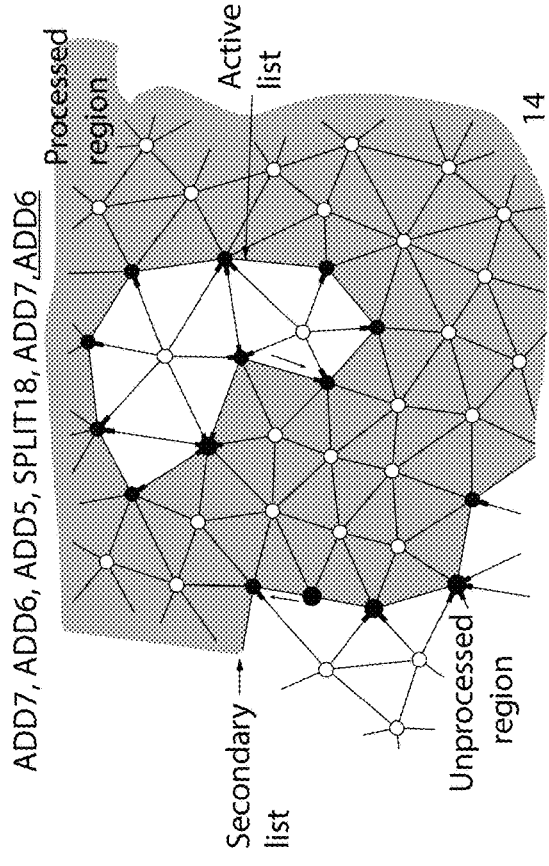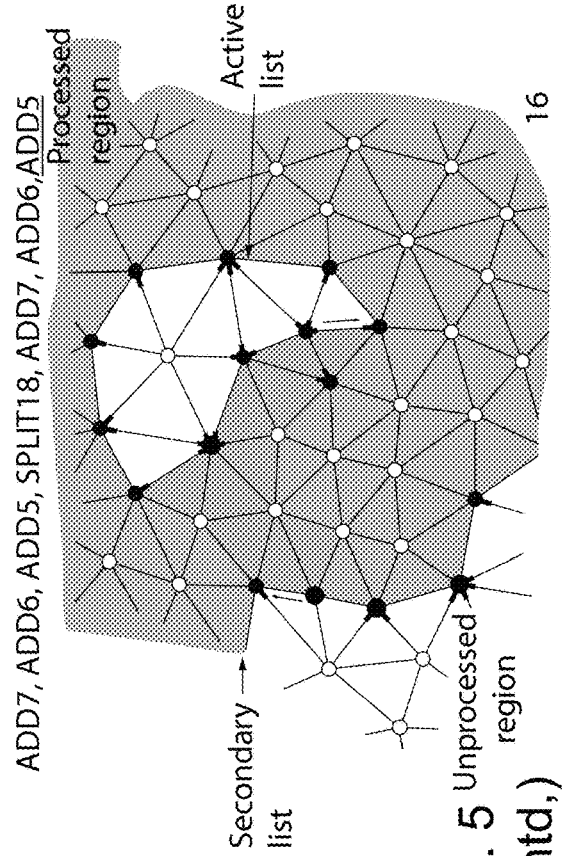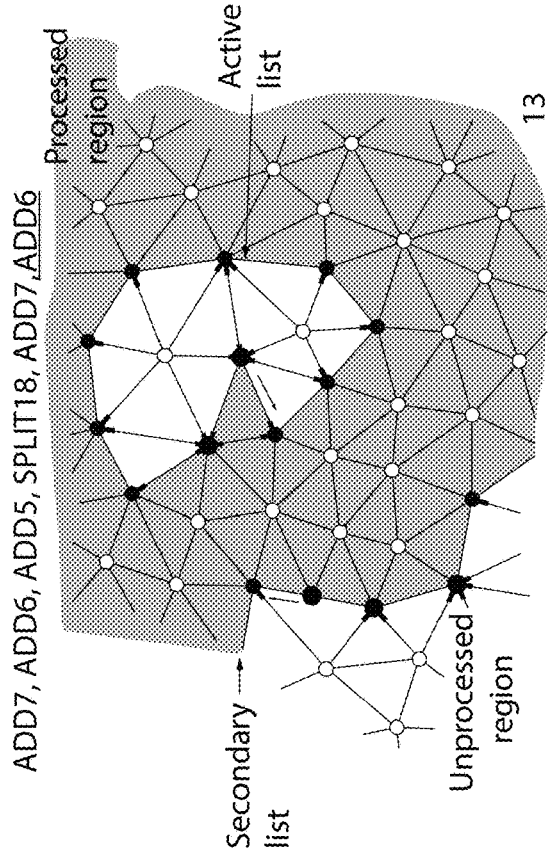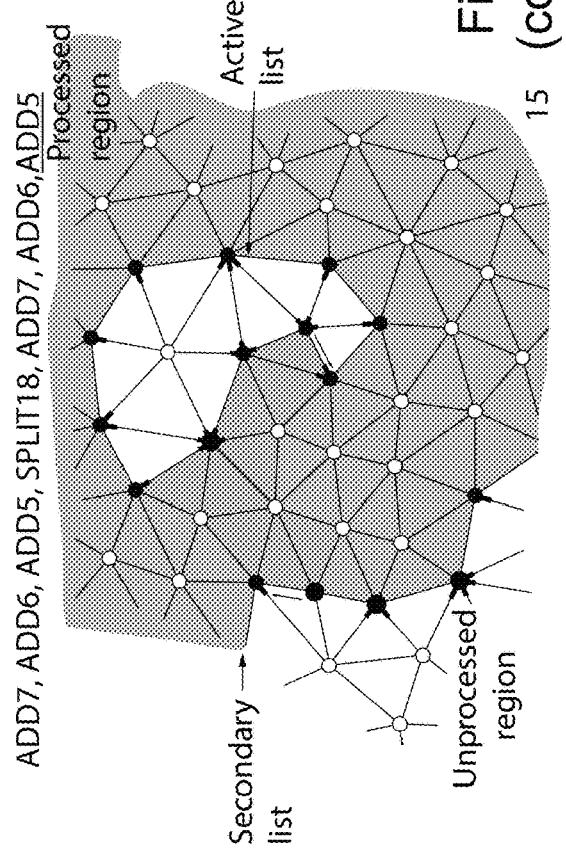
Fig. 5 (contd.)

| Symbol value (SYM) | Corresponding command |
|---|---|
| 0 | MERGE [x, y] |
| 1 | SPLIT [z] |
| 2 | ADD NEW [v] |
| 3 | ADD 3 |
| ... | |
| N | ADD N |

| | | | |
|---|---|---|---|
| SYM (i or i+1) = 0<br>coding word = 0 | | | |
| SYM(i or i+1) =1<br>coding word = 1 | | | |
| SYM(i or i+1)=2<br>coding word = 2 | | | |
| SYM(i or i+1)=3<br>coding word = 3 | | | |
| SYM(i)=4;<br>SYM(i+1)=4<br>coding word = 4 | SYM(i)=5;<br>SYM(i+1)=4<br>coding word = 8 | SYM(i)=6;<br>SYM(i+1)=4<br>coding word = 12 | SYM(i)=7;<br>SYM(i+1)=4<br>coding word = 16 |
| SYM(i)=4;<br>SYM(i+1)=5<br>coding word = 5 | SYM(i)=5;<br>SYM(i+1)=5<br>coding word = 9 | SYM(i)=6;<br>SYM(i+1)=5<br>coding word = 13 | SYM(i)=7;<br>SYM(i+1)=5<br>coding word = 17 |
| SYM(i)=4;<br>SYM(i+1)=6<br>coding word = 6 | SYM(i)=5;<br>SYM(i+1)=6<br>coding word = 10 | SYM(i)=6;<br>SYM(i+1)=6<br>coding word = 14 | SYM(i)=7;<br>SYM(i+1)=6<br>coding word = 18 |
| SYM(i)=4;<br>SYM(i+1)=7<br>coding word = 7 | SYM(i)=5;<br>SYM(i+1)=7<br>coding word = 11 | SYM(i)=6;<br>SYM(i+1)=7<br>coding word = 15 | SYM(i)=7;<br>SYM(i+1)=7<br>coding word = 19 |
| SYM(i or i+1)=8<br>coding word = 20 | | | |
| SYM(i or i+1)=9<br>coding word = 21 | | | |
| SYM(i or i+1)=10<br>coding word = 22 | | | |
| escape mode<br>coding word = 23 | | | |

Fig. 9

VALENCE-BASED ENCODING AND DECODING OF CONNECTIVITY DATA IN A 3D MODEL

This application claims the benefit under 35 U.S.C. § 119(a)-(d) of United Kingdom Patent Application No. 1708539.0, filed on May 29, 2017 and entitled "IMPROVED VALENCE-BASED ENCODING AND DECODING OF CONNECTIVITY DATA IN A 3D MODEL". The above cited patent application is incorporated herein by reference in its entirety.

FIELD OF THE INVENTION

The present invention relates generally to the encoding of three-dimensional (3D) objects, and more specifically to a method and a corresponding device for encoding, into a bitstream, connectivity data describing connectivity between connected vertices of a 3D mesh model forming polygonal faces. The present invention also relates to corresponding decoding aspects.

BACKGROUND OF THE INVENTION 3D models may be made of a cloud of points. However, more common 3D models are 3D mesh models composed of polygons, e.g. triangles, between connected points, also denoted vertices.

Typically, 3D mesh models are represented by three types of data: connectivity data, geometry data and property data. Connectivity data describe the adjacency relationship between the vertices composing the polygonal faces, while geometry data specify vertex locations or positions in a coordinate system, and property data specify attributes of the vertices such as the normal vector, material reflectance, texture mapping and color value. Most 3D compression algorithms compress connectivity data and geometry data separately.

Various methods have been proposed to encode the connectivity data, including a Spanning Tree Encoding of Meshes, such as in "*Geometric compression through topological surgery*" (Taubin G. and Rossignac J., 1998, ACM Transactions on Graphics 17, 2, 84-115); a Triangle Traversal Encoding such as in "*Edgebreaker: Connectivity compression for triangle meshes*" (Rossignac J. 1999, IEEE Transactions on Visualization and Computer Graphics 5, 1, 47-61); and the Scalable Complexity 3D Mesh Compression-Triangle-Fan (SC3DMC-TFAN) approach of the MPEG Group, for instance as described in publication "*A Triangle-FAN-based approach for low complexity 3D mesh compression*" (Mamou K., Zaharia T., Preteux F., IEEE International Conference on Image Processing, 2009).

A valence-driven encoding of the connectivity data has already been proposed. The gist of this approach is to describe vertex connectivity through their valence values, corresponding to the number of other vertices connected to the vertex considered.

A well-known and pioneering valence-driven approach is the algorithm of Touma and Gotsman, described in "*Triangle mesh compression*" (1998, In Proceedings of the 1998 Graphics Interface Conference, pp. 26-34) for triangular-faced 3D meshes. One downside of the Touma and Gotsman algorithm is that it requires some topology constraints (in particular manifold and watertight geometry) to be used. However for most of the real applications, these constraints can be artificially overcome.

The valence-driven algorithm starts off with an arbitrary triangle in the 3D mesh, defining an active list of three edges. An arbitrary vertex of this triangle is first traversed. The algorithm proceeds by trying to expand the active list by conquering or discovering not-yet discovered edges (i.e. items of connectivity information) in counter-clockwise order around the vertex currently traversed. Each such edge generates a first-type command, a so-called "add" command, to indicate or signal a new vertex at the other end of the edge and to indicate the valence value of this new vertex (typically around six). The new vertex is added at the end of the active list.

When all the edges are exhausted for the vertex currently traversed, the next vertex in the active list is next traversed; and the conquering/discovering procedure repeats for the new vertex considered. This generates an ordered list of "add" commands with associated valence values.

If the active list, during expansion, intersects itself, it is split into two active lists, each of which is traversed recursively. This event also generates a second-type command, a so-called "split" command, in the command list, with an input parameter describing the active list put aside for later processing.

Additionally, if the active list, during expansion, intersects another active list, they are merged into a single active list which is then traversed. This event also generates a third-type command, a so-called "merge" command, in the list, with two input parameters describing the merger.

The procedure terminates when all vertices of the 3D mesh have been successively traversed, and thus all edges (connectivity information) have been processed.

As the valence values attached to the generated commands are generally concentrated around six in the generated command list, the set of valence values can be efficiently compressed by applying an entropy coder, independently to the other information to encode. That is why the Touma and Gotsman algorithm provides encoding separately the "add" commands, the "split" commands and the "merge" commands, respectively (each with their input parameters).

However, as the "add", "split" and "merge" commands are interlaced in the command list, the separate encoding thereof requires some signaling is required (for instance escape codes in the command list to identify positions of the more rare "split" and "merge" commands).

The Touma and Gotsman encoder is known to achieve a compression ratio of 0.2 bit per vertex for the connectivity of regular 3D meshes and 2 to 3.5 bits per vertex otherwise. Nowadays, the Touma and Gotsman algorithm is still considered as one of the most efficient connectivity compression methods.

The decoding procedure is straightforward. Each "add" command encountered in the decoded list causes the generation of a new vertex and the associated edges (thus triangles), by connecting the new vertex to the vertex currently traversed and its predecessors in the active list. Each "split" or "merge" command is used to signal when the active list built for decoding (thanks to the "add" commands) is split into two or merged with another one, respectively.

SUMMARY OF INVENTION

The inventors have found the known valence-driven algorithms can be further improved with respect to their compression performance, taking into account that a great part of the connectivity data to encode are represented using "add" commands.

In this context, the invention proposes a method of encoding, into a bitstream, connectivity data describing connectivity between connected vertices of a 3D mesh model forming polygonal faces, the method comprising the following steps:

successively traversing the vertices of the 3D mesh model;

generating a command for each item of connectivity information not yet processed of each vertex currently traversed, thereby generating an ordered list of commands, wherein each command describes another vertex connected to the vertex currently traversed (i.e. describes an item of connectivity information) and is selected from a set of predefined commands having or not separate input parameters;

encoding the generated commands with their separate input parameters if any into the bitstream, wherein encoding the generated commands with their separate input parameters if any includes:

mapping each command of the ordered list onto a symbol, a mapping table associating commands with a set of respective symbols;

encoding the resulting list of ordered symbols while keeping its order; and separately encoding the separate input parameters, if any, of the commands of the ordered list.

Thanks to the mapping of the commands onto symbols, preferably consecutive numeral symbols, a better compression can be obtained, without using a dedicated signaling (e.g. escape codes) to signal rare commands within a command list made, in great part, of predominating "add" commands.

At decoding side, a corresponding method is proposed that uses the same advantages. The method of decoding, from a bitstream, connectivity data describing connectivity between connected vertices of a 3D mesh model forming polygonal faces, comprises the following steps:

decoding the bitstream to obtain an ordered list of commands and associated separate input parameters, wherein each command describes another vertex connected to a vertex currently traversed, executing each command of the obtained ordered list with associated separate input parameters if any, to generate a new item of connectivity information linking the other vertex to the vertex currently traversed, building the 3D mesh model based on the generated connectivity information, wherein decoding the bitstream includes:

decoding a list of ordered symbols from the bitstream;

separately decoding separate input parameters from the bitstream; and mapping each symbol of the decoded list onto a command, a mapping table associating commands with a set of respective symbols.

Correspondingly, there is provided a device for encoding into a bitstream or decoding from a bitstream, connectivity data describing connectivity between connected vertices of a 3D mesh model forming polygonal faces, the device comprising at least one microprocessor configured for carrying out the steps defined above.

Optional features of these embodiments are defined in the appended claims with reference to methods. Of course, same features can be transposed into system features dedicated to any device according to the embodiments of the invention.

For instance, the encoding method may further comprises, prior to generating the ordered list of commands, adding at least one vertex to the 3D mesh model and defining new polygonal faces between the newly added vertex and other vertices of the 3D mesh model, in order to fill a hole in the 3D mesh model. Conversely, the decoding method may thus comprise, after building the 3D mesh model based on the generated connectivity information, removing at least one vertex from the built 3D mesh model and polygonal faces involving the removed added vertex, in order to restore a hole in the 3D mesh model.

In that respect, a signalling of the sole vertex added at the encoding step is enough for the decoder to efficiently restore the original hole in the 3D mesh model.

Also, embodiments provide joint encoding/decoding of the mapped symbols. It means that the encoding method includes jointly encoding two or more consecutive symbols in the ordered list of symbols using a single coding word while the decoding method includes jointly decoding a single coding word from the bitstream into two or more consecutive symbols to add to the list of ordered symbols.

Joint encoding/decoding for the most frequent combination of symbols substantially improves compression rate.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 2a and 2b show an exemplary 3D object used to illustrate details of the invention, wherein FIG. 2a shows a top view of the 3D object while FIG. 2b shows a bottom view of the same 3D object;

FIG. 3 illustrates a raw file describing the 3D object of FIG. 2;

FIG. 3a illustrates a mechanism for filling holes in a 3D object, according to embodiments of the present invention;

FIG. 3b illustrates the modified raw file of FIG. 3 when using the mechanism shown in FIG. 3b;

FIG. 5 illustrates, through 16 images, a progressive traversal of vertices in a 3D mesh using the Touma and Gotsman algorithm, and the progressive building of a list of commands;

FIG. 9 illustrates a look-up table for mapping commands onto symbols, according to embodiments of the present invention.

DETAILED DESCRIPTION

The invention will now be described by means of specific non-limiting exemplary embodiments and by reference to the figures.

The present invention relates generally to the encoding of three-dimensional (3D) meshed objects into a bitstream. The present invention particularly seeks to improve the encoding of connectivity data describing the connectivity between the vertices composing 3D meshed objects.

From a general point of view, the vertices in the 3D meshes are connected so as to form polygons, which constitute the multiple faces of the 3D meshes. A great part of the prior art, including the Touma and Gotsman algorithm, relies on triangle-shaped polygons.

For ease of explanation, embodiments of the description below mainly refer to triangle meshed objects, and can be easily expanded to higher-level polygon meshed objects (for instance quadrilaterals) by one skilled in the art.

Figure 1:
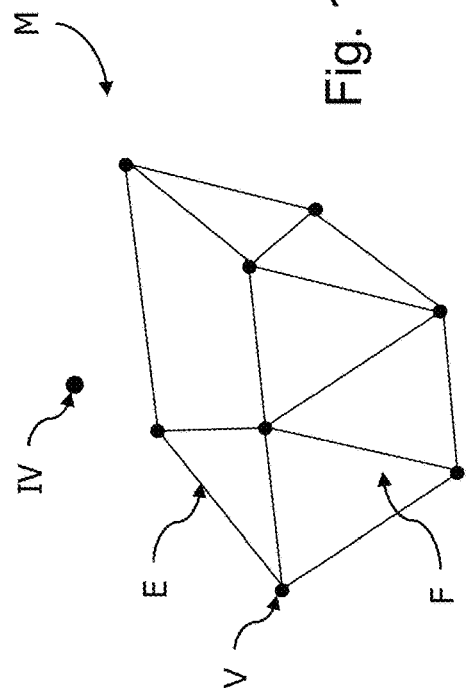
FIG. 1 illustrates a three-dimensional 3D mesh M, used to represent a three-dimensional object or scene.

FIG. 1 illustrates a three-dimensional 3D mesh M, used to represent a three-dimensional object or scene, such as for video games, animated videos, three-dimensional printing, and so on.

The mesh M comprises a plurality of vertices V (black dots), edges E (links or connections between two vertices), and faces F (delimited by edges). Each edge E connects two vertices V. Each face F is a polygon formed by three or more edges E, hence, comprising three or more vertices V.

The edges E and faces F represent the relationship between vertices V, also called connectivity information. On the other side, the positions of the vertices V in space are called geometry.

Additional attribute data, such as vertex normals (directional vector associated with a vertex), face normals, vertex colors, face colors, face texture, and so forth, can be provided in the mesh M.

Also, some vertices in the mesh M may be isolated vertices IV.

The mesh M may therefore comprise a large amount of data, in particular as the numbers of vertices V and faces F increase, in order to more finely represent the object.

Figure 2B:
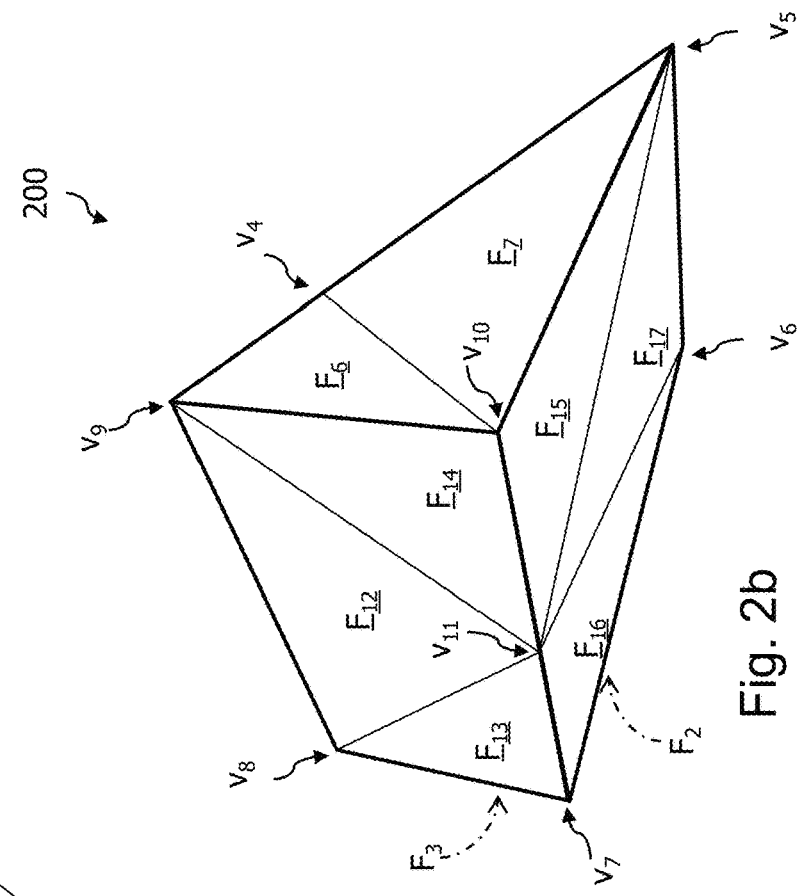
Figure 2A:
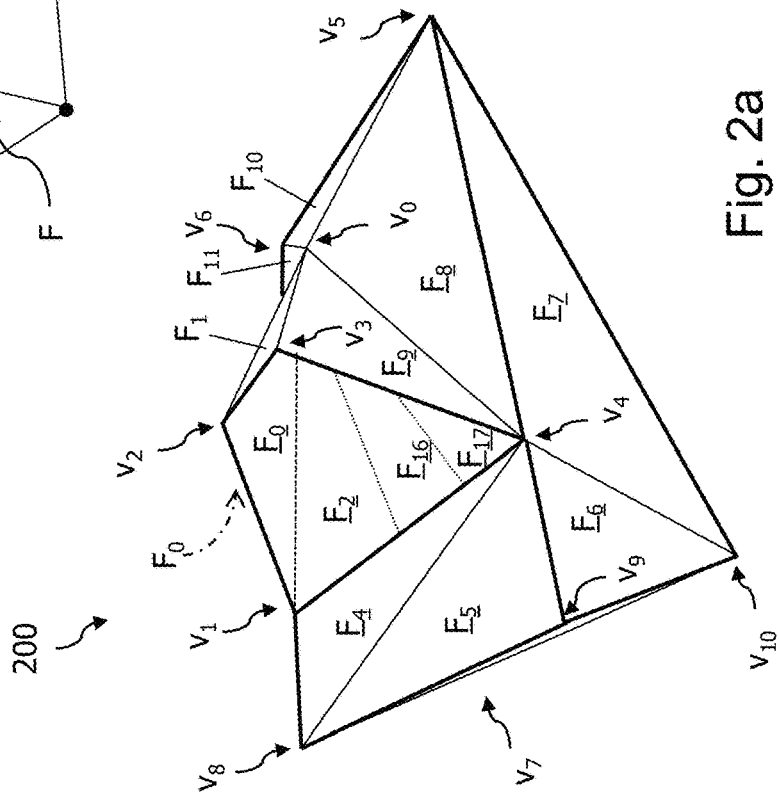

FIGS. 2a and 2b show an exemplary 3D object used to illustrate details of the invention as described below. In particular, FIG. 2a shows a top view of the 3D object while FIG. 2b shows a bottom view of the same 3D object.

The depicted 3D mesh object is made of 12 vertices ($V_0$ to $V_{11}$) and contains 18 triangular faces ($F_0$ to $F_{17}$). This 3D object is not watertight, meaning that it contains a cavity illustrated by the hole delimited by edges ($V_1$, $V_2$), ($V_2$, $V_3$), ($V_3$, $V_4$) and ($V_4$, $V_1$). Note that the inner side of faces $F_0$, $F_2$, $F_{16}$ and $F_{17}$ can be seen through the hole.

This 3D mesh object is usually defined in a file FF, such as a PLY file with ASCII representation (but other formats may exist) as shown in FIG. 3.

The file FF comprises:
header information HI to provide the structure of the file;
vertex information VL comprising as many items/elements as the number of vertex elements defined in the header HI; and
face information FI comprising as many items/elements as the number of polygonal face elements defined in the header HI.

Header HI includes a file type (PLY), a data format (format ascii 1.0), a number of vertex elements (element vertex 12), a list of vertex properties (property float x, property float y, property float z) defining the information set in the vertex elements of the vertex information VL section, a number of polygonal face elements (element face 18), and face properties (property list uchar int vertex_indices) defining the information set in the face elements of the face information FI section. Header HI ends with a specific tag (end_header);

The vertex information VL gives, for each vertex, the values of the vertex properties usually defined in the header. In the present example, the vertex properties define the geometrical components VC (i.e. position) of each vertex. As the present mesh is three-dimensional, three components X, Y, Z are provided as vertex coordinates (X, Y, Z) for each vertex. The coordinates can be represented by real numbers (comprising a fractional portion).

Note that the indication of the corresponding vertex in round brackets at the end of each line is to make the matching with FIGS. 2a and 2b easier.

The face information FI gives, for each polygonal face, the values of the face properties generically defined in the header. In the present example, they comprise a first unsigned character (uchar) representing the number of edges NE of the polygon (3, 4, or more), followed by a vertex list comprising the vertex indices Vi of the vertices forming the polygon. The vertex indices Vi correspond to the index of vertex element in the vertex information VL section (starting from vertex element 0 at the beginning of the section).

The order of the vertex indices Vi in the vertex list is generally defined by convention, in a clockwise or counter-clockwise manner, so that the normal of the face may be determined. A counter-clockwise manner has been chosen here.

Note that the indication of the corresponding polygonal face in round brackets at the end of each line is to make the matching with FIGS. 2a and 2b easier.

Figure 4:
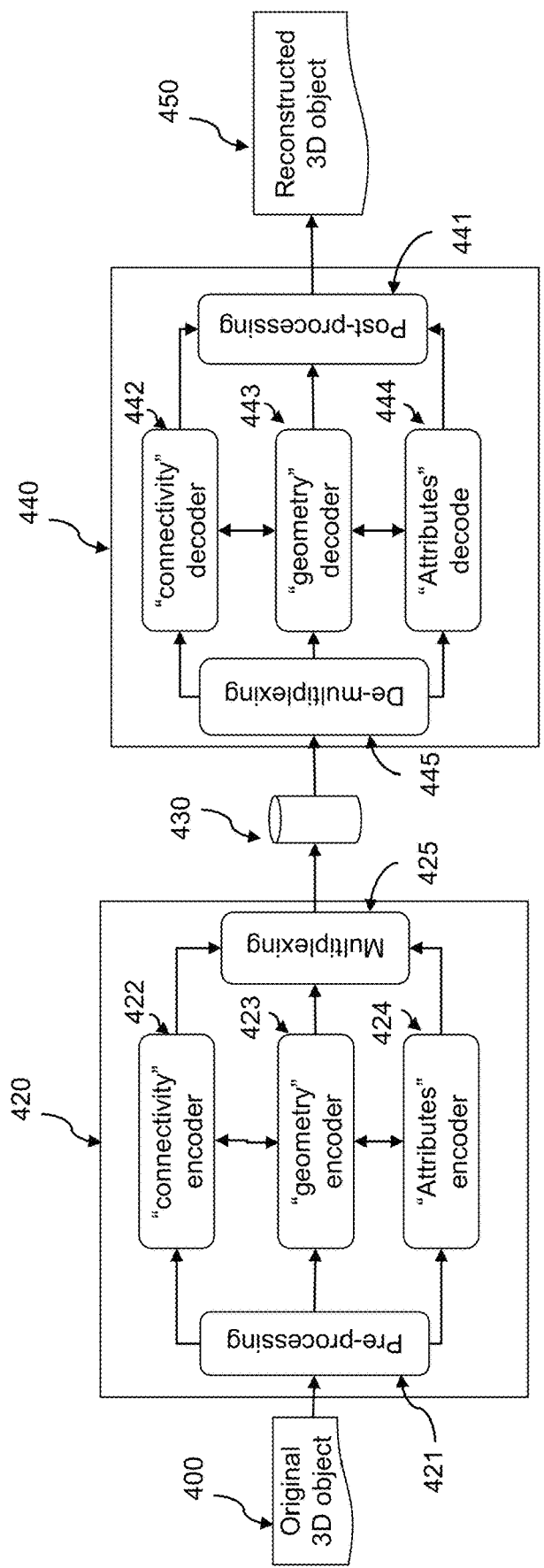
FIG. 4 schematically illustrates a 3D object encoder and its corresponding decoder.

FIG. 4 schematically illustrates a 3D object encoder 420 and its corresponding decoder 440. A 3D object 400 is to be compressed. The three types of data: connectivity data, geometry data and property data, are generally processed independently one to the other. It means that the vertex information (VL—connectivity data) and the face information (FI—geometry data) are not coded together.

An optional pre-processing 421 can be performed on the 3D object to make it compliant with the encoding algorithm to be used. Indeed, some algorithms may set topology constraints on the 3D object. This is the case of the valence-driven Touma and Gotsman algorithm, for which the 3D object must be watertight (meaning having no hole) while having only manifold edges and vertices (meaning the 3D object should not contain areas with no thickness). Thus the pre-processing 421 may modify the 3D object 400 to make it watertight while having only manifold edges and vertices.

For instance, the 3D object of FIGS. 2a and 2b has a hole delimited by edges $(V_1, V_2)$, $(V_2, V_3)$, $(V_3, V_4)$ and $(V_4, V_1)$, and it contains only manifold edges and vertices. To properly use the valence-driven Touma and Gotsman connectivity encoding algorithm, the pre-processing step 421 may consist in filing the hole.

First step in that case is to detect and identify the hole. From a visual point of view, it is easy to detect the hole for the 3D object of FIGS. 2a and 2b, between vertices $V_1$, $V_2$, $V_3$ and $V_4$.

One simple way to achieve this may consist in detecting all connected one-way edges in the file shown in FIG. 3, i.e. the edges that are declared only once in the face information FI section of the file.

Indeed, an edge normally belongs to two and only two adjacent polygonal faces. For example, the file in FIG. 3 shows that vertex $V_0$ is connected to vertex $V_1$ for face $F_0$, while the same link/connection between vertices $V_0$ and $V_1$ exists for face $F_{11}$. This edge $(V_0, V_1)$ is thus a two-ways edge.

On the other end, a hole exists when the edge only belongs to a single polygonal face. For example, vertex $V_1$ is connected to vertex $V_2$ for face $F_0$ but no other triangle in section FI involves vertices $V_1$ and $V_2$ again. Thus, edge (V1, V2) in a one-way edge.

Once a hole has been found (several holes can be detected), new faces must be artificially created to fill the hole. A first approach may consist in connecting the vertices delimiting the hole one with each other in order to define new faces.

However, embodiments of the present invention provide to add a new vertex to the 3D object and to define new polygonal (triangle) faces between the newly added vertex and other vertices of the 3D mesh model, in particular the vertices delimiting the hole. Preferably, the newly added vertex is defined at the barycenter position of the vertices delimiting the hole (i.e. which compose the one-way edges of the hole), and connections/links are created between this newly added vertex and each vertex of the one-way edges, thereby forming the new triangle faces.

FIG. 3a illustrates this approach for filling the hole of FIGS. 2a and 2b. Vertex $V_{12}$ is defined as the barycenter of $V_1$, $V_2$, $V_3$ and $V_4$, and four triangular faces $F_{18}$ to $F_{21}$ are created when connecting each one of $V_1$, $V_2$, $V_3$ and $V_4$ to new vertex $V_{12}$.

With this approach, the signaling of the newly added vertex is advantageously sufficient for the decoder to be able to restore the hole in a corresponding post-processing step 441. In particular, a dedicated command, namely a newly-added-vertex command, may be provided as extensively described below. In any case, the additional information enabling the decoder to fill the hole should be signaled to the decoder for it to be able to recover the original 3D object by removing the filling of the holes.

FIG. 3b illustrates the file of FIG. 3 after this pre-processing step, wherein the underlined bold elements have been changed or added.

The new vertex is added at the end of section VL, which is the barycenter of $V_1$, $V_2$, $V_3$ and $V_4$: $V_{12}$=(5.0, 7.0, 1.0). The number of vertex elements is thus updated in header HI, to 13.

From new vertex $V_{12}$, four new triangles are defined involving the one-way edges $(V_1, V_2)$, $(V_2, V_3)$, $(V_3, V_4)$ and $(V_4, V_1)$ respectively, as shown at the end of section FI. The number of vertex elements is thus updated in header HI, by increasing it by 4 up to 22.

The 3D object resulting from the post-processing 421 is thus used as an input for compression of the following modules 422, 423 and 424.

First of all, the connectivity information (FI) is coded by using connectivity data encoding schemes (step 422). Some schemes have been proposed above, including valence-driven encoding schemes. The valence-driven Touma and Gotsman algorithm which consists in coding in a lossless manner the list of the face information related to the 3D object is preferably used in the following description, while embodiments of the present invention applies to any valence-driven scheme.

Also, the position or geometry data (VL) are coded using conventional geometry data encoding schemes (step 423). Usually these schemes are lossy because the position of each vertex is quantized by using a certain quantization step (i.e. accuracy). Most of the known schemes use prediction, meaning that the position of a current vertex is predicted using the encoded position(s) of one or more neighbouring vertices already encoded. Some schemes use the connectivity data to define the neighbouring vertices (usually following the connectivity-based traversal of vertices). This a-priori information improves the accuracy of the prediction.

As for any prediction-based encoding, the residue (difference resulting from the prediction of the quantized position) is encoded, sometimes together with an indication of the predictor used (when it cannot be inferred directly by the decoder).

Furthermore, the attribute data, if any, are coded at step 424. In a similar way as to the geometry data, the connectivity data can be used as a-priori information to provide efficient prediction of the attribute data.

A final bitstream 430 is built by multiplexing the encoded connectivity data, the encoded geometry data and the encoded attribute data (if any) through a multiplexing step 425.

In practice, a header may be created at the beginning of the bitstream to gather the general information about the 3D object regarding the number of vertex, the number of faces and any information useful for the decoding process.

The decoding steps performed by decoder 440 are similar to those performed at the encoder 420 but in a reverse way. First of all, the received bitstream 430 is de-multiplexed in step 445 to extract the sub-streams related to the connectivity data, the geometry data and the attribute data respectively.

Next, the sub-stream of connectivity data is decoded (step 442) to obtain items of connectivity information, and a connectivity representation of the 3D object is built by defining the vertices and the connections between them.

Also, the sub-stream of geometry data is decoded (step 443) to provide vertex position to each vertex of the built connectivity representation of the 3D object. Of course, the decoded connectivity data may be used as a-priori information, if necessary.

Furthermore, the sub-stream of attribute data, if any, is decoded (step 444) to provide attributes to each vertex/edge of the 3D object.

The post-processing step 441 enables to carry out the inverse tasks of the pre-processing 421 to generate exactly the same object 450 of the original one 400. Optionally, the post processing 441 is not performed depending on the application which is targeted after the reconstruction (for instance some applications do not need to remove the faces used to fill an original hole). Information about the activation or not of this processing 441 can be done through a flag provided by the encoder in bitstream 430.

For example, if the 3D object must be printed with a 3D printer, the 3D object should be watertight and made of only manifold edges and vertices. In that case, post processing 441 is disabled, so as to not modify the 3D object. Otherwise, if the target is to preserve the original 3D object characteristics after compression and, for example, to keep the original hole in the 3D object of FIGS. 2a and 2b, post-processing 441 is enabled.

As indicated above, an exemplary valence-driven connectivity data encoding scheme used at step 422 is the Touma and Gotsman algorithm. Embodiments of the present invention are now illustrated based on this algorithm, while the present invention applies to any valence-driven connectivity data encoding scheme, i.e. schemes that encode the connectivity data by defining the valences of the vertices.

Like any connectivity data encoding scheme, the vertices of the 3D mesh model are successively traversed, and the connectivity configuration at the vertex currently traversed is used to emit symbols selected from few possibilities. The traversal is made based on the connectivity between vertices, thereby usually modifying the order of the vertices (compared to the order in the file of FIGS. 3 and 3b)

The generated symbols are then entropy coded using, for example, a Huffman coder or an arithmetic coder.

For the family of valence-driven encoding schemes, the symbols emitted mirror the valences of the new vertices that can be discovered from the vertex currently traversed, using the connectivity data. In other words, the number of vertices connected to each newly discovered vertex (i.e. the valence) is encoded.

Usually, a command is generated for each item of connectivity information not yet processed (e.g. free edge) of each vertex currently traversed. As a result, an ordered list of commands is generated, wherein each command describes the newly discovered vertex connected to the vertex currently traversed and is selected from a set of predefined commands having or not having separate input parameters.

The Touma and Gotsman algorithm starts off with an arbitrary triangle in the 3D mesh, defining an active list of three edges. An arbitrary vertex of this triangle is first traversed. The algorithm proceeds by trying to expand the active list by conquering or discovering not-yet discovered edges (i.e. items of connectivity information) in counterclockwise order around the vertex currently traversed. Each such edge generates a first-type command, a so-called "add" command, to indicate or signal a new vertex at the other end of the edge and to indicate the valence value of this new vertex (typically around six). In the context of the present invention, each "add" command supplemented (or combined) with a corresponding valence value is considered as being a first-type combining command indicating when a new vertex which is connected to the vertex currently traversed (given an edge defining connectivity data at the current vertex) is encountered for the first time and intrinsically indicating its valence value without any separate input parameter. Such a first-type combining command will be processed as a whole as done for any command like ADD NEW, MERGE, SKIP commands introduced below.

The new discovered vertex is added at the end of the active list.

When all the edges are exhausted for the vertex currently traversed, the next vertex in the active list is next traversed; and the conquering/discovering procedure repeats for the new vertex considered. This generates an ordered list of "add+valence" items. In the context of the present invention as explained below with more details, this ordered list of commands will be processed as an ordered list of combining commands without separate input parameter. In practice, the "add+valence" combining commands may be only represented by their respective valence value successively added to the active list, thus forming a list of valence values typically concentrated around six. Therefore, the generated list of vertex valences can be efficiently compressed by an entropy coder.

However, during the vertex traversal, it may happen that a not-yet-processed edge at a current vertex leads to a vertex that has already been discovered. Two situations may occur depending on whether the already-discovered vertex belongs to the same active list, or to another active list (or "secondary list" to be processed later on).

If the active list, during expansion, intersects itself (i.e. when the vertex at the other end of the edge being considered belongs to the same active list), it is split into two lists, each of which is traversed recursively (a first one remains the active list, while the other one becomes a "secondary list" to be processed later on). This event also generates a second-type command, a so-called "split" command, in the list of commands, with a separate input parameter describing the part remaining in the active list (the remainder forming the secondary list put aside for later processing), in particular the number of edges not yet visited (deduced from the valence values of the next vertices in the list up to the intersection vertex, given the edges already visited).

Otherwise, if the active list, during expansion, intersects another list (in fact a secondary list) (i.e. when the vertex at the other end of the edge being considered belongs to a secondary list), the two lists (current active one, and secondary one) are merged into a single active list which is then traversed. This event also generates a third-type command, a so-called "merge" command, in the list, with separate input parameters describing the merger, indicating which secondary list (from among a plurality of secondary lists that may exist) is concerned and the offset identifying the intersecting vertex in the secondary list.

As a consequence, the ordered list of commands may interleave "add" commands with "split" and "merge" commands.

Also, embodiments of the invention provide a new specific command, namely newly-added-vertex command or "add new" command, to indicate when the newly discovered vertex connected to the vertex currently traversed is a vertex added to the 3D mesh model to fill a hole (i.e. a vertex added at pre-processing step 421). This dedicated command (different from the "add" commands above) is used as a signalling, to the decoder, of an added vertex. This dedicated command has a separate input parameter defining the valence value of the newly added vertex.

One may see that, although this is an "add" command, this specific command is not processed like the other, as the valence value is handled as a separate input parameter. It means that several vertices added to fill holes are encoded using the same "add new" command, although their respective valence values are different.

As for the "split" and "merge" commands, the "add new" commands are also interleaved with the "add" commands in the ordered list of commands.

The procedure to build the ordered list of commands terminates when all vertices of the 3D mesh have been successively traversed, and thus all edges (connectivity information) have been processed.

FIG. 5 illustrates, through 16 images, the progressive traversal of vertices in a 3D mesh using the Touma and Gotsman algorithm, and the progressive building of the list of commands.

Image 01 does not correspond to the starting point of the algorithm, but to an intermediate step where the darker area has already been processed (i.e. connectivity data have been converted into commands—not shown) while the lighter area corresponds to vertices, edges and triangles not yet processed.

The active list is made of the vertices forming the curve between the darker and lighter areas, shown by the dark dots. Starting from the dark dots, dark beginnings of lines (edges) show which free edges have not yet been processed for the vertices belonging to the active/secondary lists.

The vertex currently traversed in shown by a thick arrow in Image 01.

In Image 02, the first free edge starting from the vertex currently traversed points to a new vertex (not yet discovered) to add to the darker area. As this new vertex has a valence equal to 7 (i.e. it is connected to 7 other vertices), an "ADD 7" combining command is generated.

The next free edge starting from the vertex currently traversed points to a new vertex points to another new vertex which has a valence equal to 6: an "ADD 6" combining command is generated (Image 03). Next, as all the free edges for the vertex currently traversed have been processed, the next vertex in the active list (shown in Image 01) is selected (thick arrow in Image 04). In Image 05, an "ADD 5" combining command is generated, and the next vertex is selected in the active list (thick arrow in Image 06).

In Image 07, the end vertex of the first free edge considered for the vertex currently traversed belongs to the active list (thick arrow pointing to a dark dot). As indicated above, the active list must be split into two. Thus, a "SPLIT" command is generated, with the separate input parameter "18" to represent the sum of the free edges remaining in the active list (in Image 07, it represents the number of dark beginnings of edges in the closed active list).

Image 09 to Image 16 correspond to the generation of other "ADD val" combining commands (Val' being the valence value) by going through the free edges of the closed active list.

The algorithm is completed when all free edges have been processed in a 3D object (not shown in FIG. 5).

When this algorithm is applied to the 3D mesh object defined in FIG. 3b, the following ordered list of commands is obtained:

TABLE 1

01: ADD 6 (corresponding to vertex [0])
02: ADD 5 (corresponding to vertex [6])
03: ADD 7 (corresponding to vertex [1])
04: ADD 4 (corresponding to vertex [2])
05: ADD 4 (corresponding to vertex [3])
06: ADD 8 (corresponding to vertex [4])
07: ADD 5 (corresponding to vertex [5])

TABLE 1-continued

08: ADD 6 (corresponding to vertex [11])
09: ADD 4 (corresponding to vertex [7])
10: ADD 5 (corresponding to vertex [8])
11: SPLIT With input parameter 2
12: ADD 4 (corresponding to vertex [9])
13: ADD 4 (corresponding to vertex [10])
14: ADD NEW with input parameter 4 (corresponding to vertex [2])

As we can see, 13 "ADD" (N=13) commands (including the "ADD x" combining commands and the "ADD NEW" command) are generated during the traversal process which correspond to the 13 vertices on the 3D object of FIG. 3b (after hole filling). The command of line 11 above corresponds to a "split" command and the last command "ADD NEW" describes the added vertex to fill the hole (with input parameter "4" representing the valence value, and thus the number of created triangles, of the new vertex—see FIG. 3a).

Practically, when encoding a typical mesh, the Touma and Gotsman algorithm contains exactly N "ADD" commands (where N is the number of vertices in the mesh after hole filling), including the "ADD x" and "ADD NEW" commands.

It also generates some "split" commands (with offset parameter) but in a very few percentage which is approximately in the range of 2% to 10% depending of the considered 3D object. The "merge" commands (with index and offset parameters) are fully related to the topology of the mesh and its number directly depends on the genus of the 3D object. Typically if the 3D object has a sphere topology (genus=0), no "merge" command will be generated and only one will be emitted for a torus-like topology of genus=1.

To avoid the cost of signaling the interleaving between "add", "split", "merge" and "add new" commands, the present invention proposes:

to map each command of the ordered list of commands onto a symbol, wherein a mapping table associates commands with a set of respective symbols, preferably consecutive numeral symbols such as the integers from 0 to the maximum valence value; and to encode the resulting list of ordered symbols keeping its order.

By mapping all the commands onto symbols, no escape code or other signalling data, which costs a lot of bits, are required in the bitstream. On the contrary, by using symbols for very rare commands of the same type as the symbols used for very frequent commands, better compression can be obtained for the overall list.

A preferred embodiment provides that the "add val" combining commands, i.e. combining commands intrinsically defining valence values, are mapped onto (i.e. associated with) respective symbol values equal to their intrinsically-defined valence values (i.e. from valence 3 to the maximum valence value), and that the "split", "merge" and "add new" commands, i.e. commands not intrinsically defining valence values, are mapped onto (associated with) respective symbol values from a set of unused valence values, e.g. {0, 1, 2}. Indeed, for a watertight object, the valence of any vertex cannot be less than 3.

Due to the rarity of the "split", "merge" and "add new" commands, the symbols of the ordered list are still concentrated around six, enabling an entropy coder to be still efficient.

In variants where no "split" or "merge" or "add new" command is generated, one or more symbol values of {0,1,2} remain free, allowing to shift the symbols for the "add val" combining commands by the number of symbol values remained free. For instance, if no "merge" and "add new" command are provided, the symbols for the "add val" commands may start from symbol value equal to 1 (the value '0' being kept to encode the "skip" commands). This reduces the maximum value of the symbols, thereby improving coding efficiency.

Figures 6, 7:
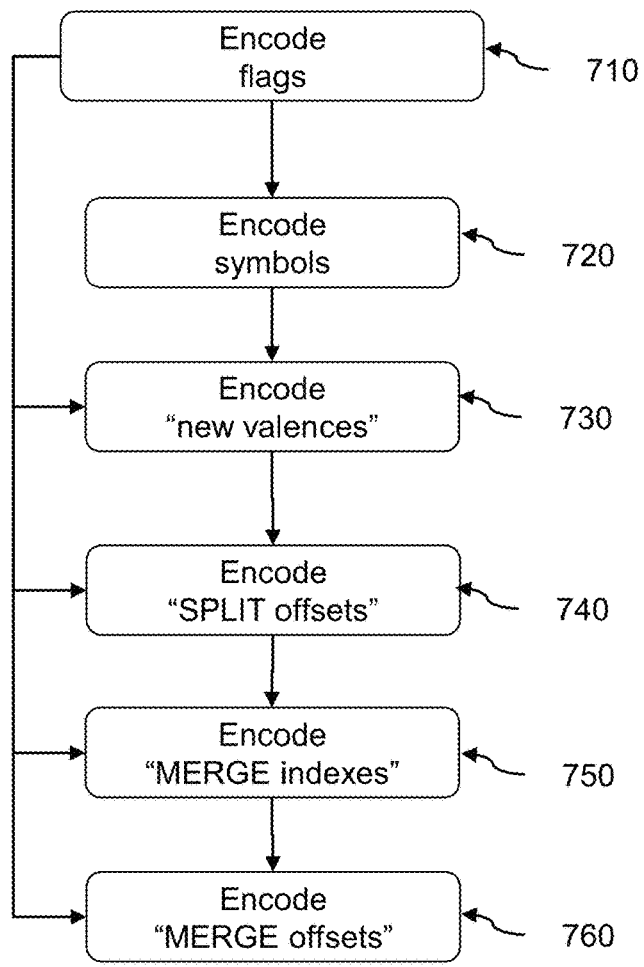
FIG. 6 illustrates an exemplary valence-based mapping of commands onto consecutive symbols, according to embodiments of the present invention.
FIG. 7 illustrates, using a flowchart, steps of encoding generated commands through the encoding the symbols and of the input parameters.

FIG. 6 summarizes one possible mapping, wherein the "merge" command is mapped onto symbol "0", the "split" command is mapped onto symbol "1" and the "add new" command is mapped onto symbol "2". All the "add val" (val being the valence value of the newly added vertex) combining commands are mapped onto symbol equal to val, with N the maximum valence value.

To minimize the number of bits to represent the symbols, the maximum valence value (encountered) may be signalled in the bitstream, in order for the decoder to be able to infer the number of bits used by the encoder.

When this mapping is applied to the 3D mesh object defined in FIG. 3b, the following ordered list of symbols and associated separate input parameters can be obtained:

TABLE 2

| Command | Separate input parameter values | Symbol for command |
|---|---|---|
| 01: ADD 6 | — | 6 |
| 02: ADD 5 | — | 5 |
| 03: ADD 7 | — | 7 |
| 04: ADD 4 | — | 4 |
| 05: ADD 4 | — | 4 |
| 06: ADD 8 | — | 8 |
| 07: ADD 5 | — | 5 |
| 08: ADD 6 | — | 6 |
| 09: ADD 4 | — | 4 |
| 10: ADD 5 | — | 5 |
| 11: SPLIT | 2 | 1 |
| 12: ADD 4 | — | 4 |
| 13: ADD 4 | — | 4 |
| 14: ADD NEW | 4 | 2 |

Due to a lack of correlation between the valence values (generally around 6) and the separate input parameters (offset, index or valence value) of the "split", "merge" and "add new" commands, the separate input parameters of the commands of the ordered list are separately encoded.

Preferably and to take advantage of their correlation, the values taken by each separate input parameter in all occurrences of a given command in the ordered list of commands may be grouped together, keeping the order of the ordered list of commands, and the group of values may then be encoded.

The proposed mapping between a command and a given symbol has been done in that way for coding efficiency purpose and it is based on some observations when encoding 3D objects:

For the "merge" command (SYM=0), it is important to separate the coding of the "index" and the "offset" parameters because the "index" parameter is not a so large value while the "offset" parameter can be of a large value in the range of the number M of vertices in the 3D mesh. From an entropy coding point of view, it is better to consider the encoding of the values taken by the "offset" parameter in a different way. It means separately encoding the separate input parameters includes independently encoding the values taken by two separate input parameters in all occurrences of a given command (here the "merge" command) in the ordered list of commands.

For the "split" command (SYM=1), similarly, the "offset" parameter can be of a large value and in the range of the number M of vertices in the 3D object.

For the "add new" command (SYM=2), it makes it possible to distinguish an "add" command when a vertex is artificially added to fill a hole. Indeed, the valence value for such artificial vertices may be highly decorrelated from a normal valence value (around 6). This is because, as proposed above (but other implementations may be contemplated), this new vertex is connected to all vertices (which may be numerous) forming the hole. So the valence value put as a separate input parameter can be high, and it is more efficient to consider coding these valence parameters in a separated way.

FIG. 7 illustrates, using a flowchart, steps of encoding the generated commands through the encoding of the generated list of ordered symbols and their separate input parameters.

At a first optional step 710, the encoder may signal in the bitstream if there are "split", "merge" and/or "add new" commands generated by the Touma and Gotsman algorithm. It is thus signalled, in the bitstream, whether the ordered list of commands includes, in addition to first combining commands intrinsically defining valence values, other commands that do not intrinsically define valence values. It corresponds to signal, in the bitstream, whether the list of symbols includes one or more values equal to "0" or "1" or "2".

Preferably, the presence of the "split", "merge" and/or "add new" commands are separately signalled, meaning that up to three flags can be coded in the bitstream to signal the presence of respectively "split", "merge" and "add new" commands and their associated separate input parameters This step 710 is optional because this information can be inferred from the list of symbols that is encoded in the next step. However, knowing this information (for the decoder) before decoding the list of symbols advantageously makes it possible to infer the range of possible symbols. Indeed, as indicated above, the range of symbol values for the "add val" combining commands may be shifted by the number of commands not used from amongst the "split", "merge" and "add new" commands. Such shifting results in having lower symbol values, and thus in having better compression efficiency.

The flags may also be used to indicate whether or not signalling information (e.g. number of items, minimum and maximum values) are provided for each separate input parameter to allow the decoder to infer the length of the code words used.

In the next step 720, the list of ordered symbols is coded while keeping its order. This step corresponds to encode integer values between 0 and N (with N the maximum valence value in the 3D object), or less in case of symbol value shifting. Depending of the flags encoded above, the starting value can be either 0, 1, 2 or 3 (if only "add" commands), which helps optimizing the number of symbols required to encode each command.

Practically, the amount of data corresponding to the "add val" combining commands represents more than 90% of the total information to be coded, and the corresponding symbols are highly correlated (generally around 6). The symbols can thus be encoded by using an arithmetic entropy coder.

Figure 8:
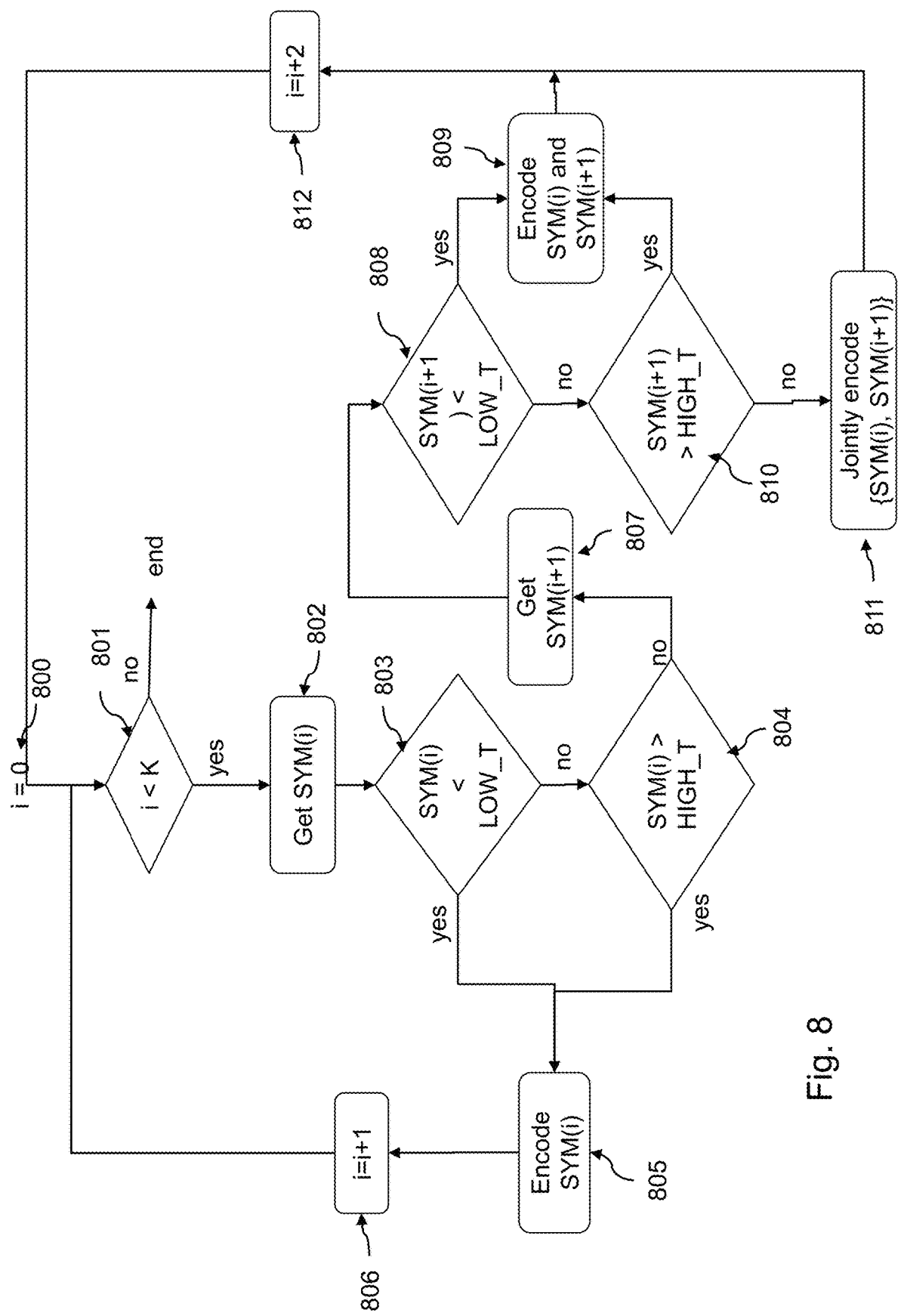
FIG. 8 illustrates an exemplary encoding of the symbols using a joint encoding approach, according to embodiments of the present invention.

In a variant, an enhanced encoding scheme as illustrated in FIG. 8 can be used. The gist of this enhanced scheme is to jointly encoding two or more consecutive symbols in the ordered list using a single coding word, in particular when they correspond to two consecutive "add val" combining commands. Indeed, the inventors have noticed that there is a high probability that neighbouring vertices have a very similar valence. The proposed joint encoding thus takes advantage of this notice to improve compression.

A variable "i" used to successively consider each symbol in the ordered list (containing K symbols) is initialized to 0 at step 800.

Step 801 is a test to determine whether the current symbol is the last one in the list of symbols or not. In case of positive determining, the process ends. Otherwise, the next step is step 802 where the symbol SYM(i) is read from the memory.

Next, steps 803 and 804 seek to determine whether the symbol SYM(i) is mapped onto a first combining command (combination of an add command with a valence value) intrinsically defining a valence value that belongs to a predefined reference range or not. In particular, step 803 checks whether the value of SYM(i) is less than the low endpoint LOW_T of the reference range. This endpoint LOW_T is a way to determine the low limit of correlation between symbol values. In particular, there is no real correlation between symbol=0 and symbol=1. Therefore, there is no need to consider any combination of symbols having 0 and 1 as element for joint encoding as they are not correlated.

In practice, LOW_T can be set to 3 or 4.

If the test is positive at step 803 (SYM(i) is not liable to provide correlation), next step is step 805 where SYM(i) is coded alone. Any entropic coder can be used to perform the compression of this symbol by using an arithmetic encoder for example.

Next, counter "i" is incremented by one at step 806 to process the next symbol in the list.

When test 803 is negative (SYM(i) is liable to provide correlation), a new test is performed at step 804 to checks whether the value of SYM(i) is higher than the high endpoint HIGH_T of the reference range. As for the endpoint LOW_T, endpoint HIGH_T determines a high low limit from which it may be considered there is no correlation between symbol values. Indeed, consecutive high valence values (above HIGH_T) are not frequent and are weakly correlated.

If test 804 is positive, next step is step 805 to encode SYM(i).

If test 804 is negative, SYM(i) belongs to the predefined reference range defining the range of high correlation.

Next step 807 consists in reading the next symbol SYM(i+1) from the memory. Similar tests as tests 803 and 804 are carried out on SYM(i+1) (tests 808 and 810) to determine if SYM(i+1) belongs to the predefined reference range. Thus it is determined whether or not the two (or more) consecutive symbols of the ordered list belong to the predefined reference range or not.

If SYM(i+1) does not belong to the predefined reference range (positive answer at test 808 or 810), step 809 is performed where SYM(i) and SYM(i+1) are each coded alone (i.e. independently encoded in a similar way as in step 805). The next step is step 812 where counter "i" is incremented by 2 to process the next symbol value.

If SYM(i+1) belongs to the predefined reference range (negative answers at tests 808 and 810), SYM(i) and SYM(i+1) are considered to be highly correlated. It is thus proposed to jointly encode them in order to exploit this correlation from an entropy point of view, instead of coding these two values separately. This is done at step 811.

Note that steps 807, 808 and 810 can be repeated one or more times with one or more next symbols SYM(i+2) . . . if it is sought to jointly encode a multiplicity of three or more symbols.

Also, the endpoints LOW_T and HIGH_T of the reference range for correlation may be new for each considered 3D object. In addition, they can be updated on a regular basis (for example based on the number of emitted symbols) or on any other basis during the encoding of the 3D mesh object. In that case, they can be signalled in the bitstream.

To perform step 811, a look-up table can be used. An example is illustrated in FIG. 9 where the reference range is [4-7] and the maximum valence value is N=10. Each symbol under 4 is encoded using a coding word equal to the symbol. Each combination of symbols within the reference range is jointly encoded (here two symbols by two symbols), where the coding word '4' is associated with pair {SYM(i)=4, SYM(i+1)=4}, the coding word '5' is associated with pair {SYM(i)=4, SYM(i+1)=5}, . . . , the coding word '8' is associated with pair {SYM(i)=5, SYM(i+1)=4}, . . . , the coding word '19' is associated with pair {SYM(i)=7, SYM(i+1)=7}. Each symbol over 7 is encoded using the next coding words available, here '20', '21' and '22'. Note that the coding word thus generated may be the entry of the entropic coder.

The joint encoding thus consists in searching, in the look-up table, a coding word associated with the combination of the two or more symbols considered.

To make it possible for the decoder to have the same look-up table and hence to perform efficient decoding, one or two endpoints of the predefined reference range may be signalled in the bitstream.

The following lines give some examples of two consecutive symbols and how they are coded using the look-up table of FIG. 9:

If SYM(i)=0 and SYM(i+1)=1, then the entropic coder encodes coding word=0, followed by coding word=1. This corresponds to go twice through step 805.

If SYM(i)=4 and SYM(i+1)=7, then the entropic coder encodes the coding word=7. This corresponds to step 811.

If SYM(i)=6 and SYM(i+1)=6, then the entropic coder encodes coding word=14. This corresponds again to step 811.

Finally, if SYM(i)=6 and SYM(i+1)=3, then the entropic coder encodes coding word=14 (or 12, or 13 or 15) to encode SYM(i), followed by particular coding code=23 which corresponds to an escape code to indicate that the second value corresponding to event 14 [SYM(i+1)=6] is not used. Next, SYM(i+1)=3 is encoded using coding code=3. This corresponds to separately encode the two consecutive values SYM(i)=6 and SYM(i+1)=3 as depicted in step 809. Note that in case SYM(i) is within the predefined reference range but SYM(i+1) is not, the encoding of SYM(i) gives preference to the most probable coding word, i.e. to the coding word having SYM(i) in combination with the most probable value for SYM(i+1), i.e. 6 in the present example. Indeed, entropy encoding will use fewer bits to encode such most probable coding word. This is why coding word 14 is preferred rather than 12, 13 or 15 in the above example.

This coding scheme is particularly efficient as the most probable coding words shown in the cells in the middle of the look-up table are dedicated to two consecutive symbols.

For the other cells (at the beginning and end of the table), as the correlation between this symbol and another symbol is rather low, any grouping of symbols cannot be statistically exploited by the entropic coder to reduce the bitrate. Therefore, it is not efficient from a coding perspective to group them.

Step 811 is followed by step 812 to process the next symbol in the list.

Turning back to FIG. 7, once the list of symbols has been encoded, the next steps are steps 730, 740, 750, 760 to encode the separate input parameters of the commands. These steps may be performed in any order, and possibly in parallel, as each one applies to a different set of parameter values. To be noted that depending on the values of the flags (step 710) or the presence of corresponding "split", "merge" and "add new" commands in the list of commands, some of these steps may be disabled in order to avoid useless processing.

For instance, step 730 encodes the valence (separate input parameter) of the artificially added vertices to fill the holes of a 3D object, if any. As the valence of each artificial vertex depends on the number of vertices that defines the limit of the hole, it is also practically preferable to encode this information in a separate way. Most of the time, these values are not correlated and a fixed length coder may appear to be more appropriate for encoding such data. Most of the time the minimum and maximum valence values of the added vertices are also coded to determine the length of the code word.

Step 740 encodes the offset values (separate input parameters) of the "split" commands, if any. From a practical point of view, the offset values are quite sparse values ranging from 1 to M which is the number of vertices in the 3D object. This is generally difficult to exploit any redundancy in such data and a fixed length coder seems also more appropriate to encode such data. Similarly to step 730, the minimum and the maximum offset values of the split commands are also coded to determine the length of the code word.

Steps 750 and 760 encode the separate input parameters of the "merge" commands, namely the offset values and the index values. They generally represent very small amount of information and as, for step 740, a fixed length coder appears more appropriate to encode the values of these two parameters. Similarly to step 730, the minimum and the maximum offset and index values of the merge commands are also coded to determine the length of the code word.

The description above focuses on the encoder. Corresponding operations are performed by the decoder, one skilled in the art being able to apply the decoding features corresponding to the above teachings without difficulties.

Basically, the decoder decodes the bitstream to obtain an ordered list of commands and associated separate input parameters, wherein each command describes another vertex connected to a vertex currently traversed. According to the invention such decoding includes decoding a list of ordered symbols from the bitstream; separately decoding separate input parameters from the bitstream; and mapping each symbol of the decoded list onto a command, a mapping table associating commands with a set of respective symbols, preferably consecutive numeral symbols.

The decoder then executes each command of the obtained ordered list with associated separate input parameters if any, to generate a new item of connectivity information linking the other vertex to the vertex currently traversed. Next, it builds the 3D mesh model based on the generated connectivity information, The commands are those defined above, as well as the symbols and the mapping and look-up tables (FIGS. 6 and 9). A signalling retrieved from the bitstream may help the decoder to determine whether the received bitstream includes "split" and/or "merge" and/or "add new" commands and their associated separate (input) parameters. Also the endpoints LOW_T and HIGH_T of the reference range may be retrieved from the bitstream for the decoder to be able to build the same look-up table as the encoder.

To reconstruct the connectivity information (i.e. the edges between the vertices), the decoder may jointly decode a single coding word from the bitstream into two or more consecutive symbols (using the look-up table) to add to the list of ordered symbols.

Also, based on any symbol associated with the "add new" command, the decoder is able to restore any original hole, without additional information. In particular, after building the 3D mesh model based on the generated connectivity information, the decoder may remove at least one vertex (e.g. identified by the "add new" command) from the built 3D mesh model and polygonal faces involving the removed added vertex, in order to restore a hole in the 3D mesh model.

Figure 10:
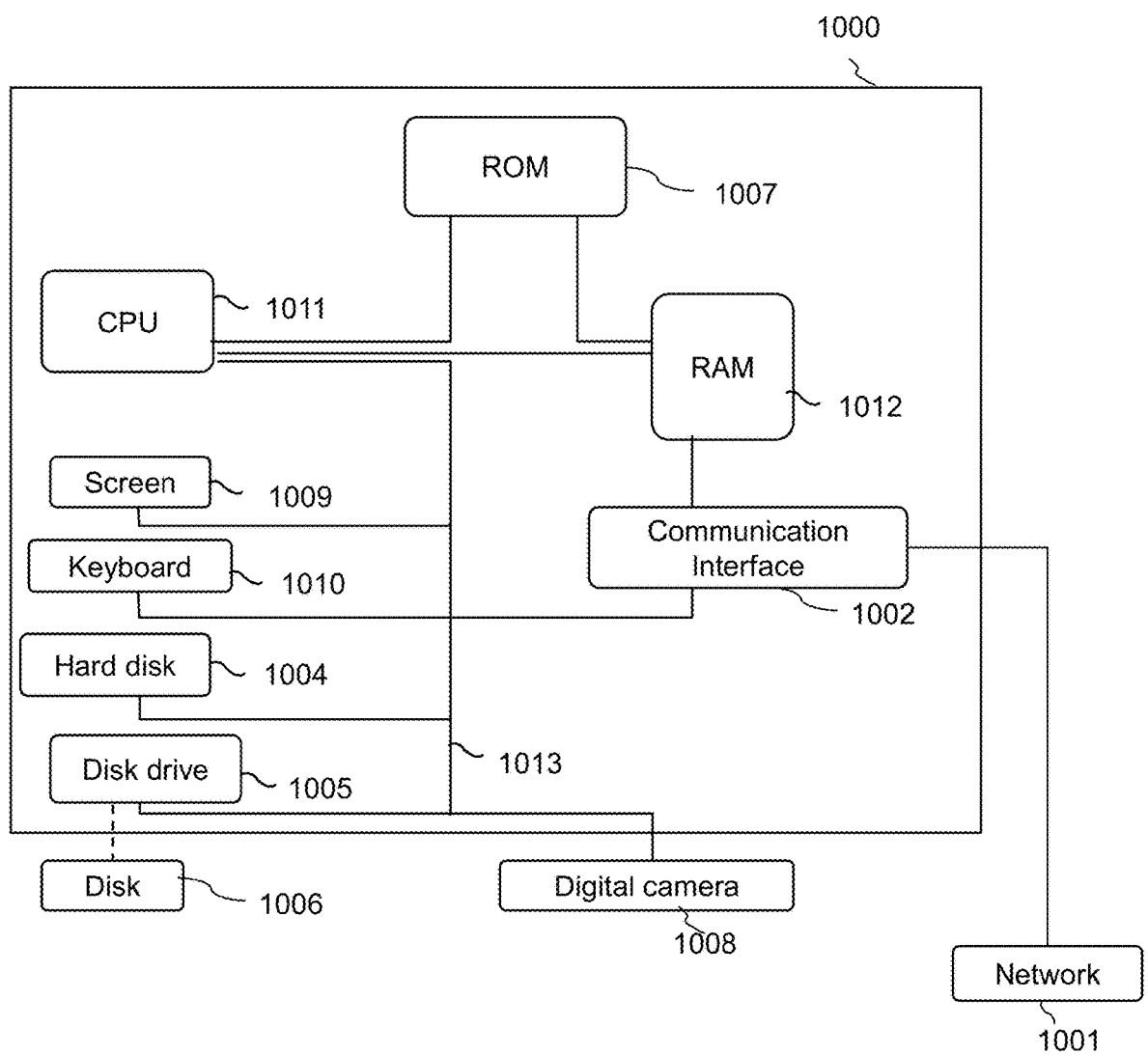
FIG. 10 shows a schematic representation a device in accordance with embodiments of the present invention.

FIG. 10 schematically illustrates a device 1000 to implement at least one embodiment of the present invention. The device 1000 may preferably be a device such as a microcomputer, a workstation or a light portable device. The device 1000 comprises a communication bus 1013 to which there are preferably connected:

- a central processing unit 1011, such as a microprocessor, denoted CPU;
- a read only memory 1007, denoted ROM, for storing computer programs for implementing the invention;
- a random access memory 1012, denoted RAM, for storing the executable code of methods according to embodiments of the invention as well as the registers adapted to record variables and parameters necessary for implementing methods according to embodiments of the invention; and
- at least one communication interface 1002 connected to a communication network 1001 over which data may be transmitted.

Optionally, the device 1000 may also include the following components:

- a data storage means 1004 such as a hard disk, for storing computer programs for implementing methods according to one or more embodiments of the invention;
- a disk drive 1005 for a disk 1006, the disk drive being adapted to read data from the disk 1006 or to write data onto said disk;
- a screen 1009 for displaying data and/or serving as a graphical interface with the user, by means of a keyboard 1010 or any other pointing means.

The device 1000 may be optionally connected to various peripherals, such as for example a digital camera 1008 or 3D printer (not shown), each being connected to an input/output card (not shown) so as to supply data to the device 1000 or receive data from the device 1000.

Preferably the communication bus provides communication and interoperability between the various elements included in the device 1000 or connected to it. The representation of the bus is not limiting and in particular the central processing unit is operable to communicate instructions to any element of the device 1000 directly or by means of another element of the device 1000.

The disk 1006 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 1007, on the hard disk 1004 or on a removable digital medium such as for example a disk 1006 as described previously. According to an optional variant, the executable code of the programs can be received by means of the communication network 1001, via the interface 1002, in order to be stored in one of the storage means of the device 1000, such as the hard disk 1004, before being executed.

The central processing unit 1011 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 1004 or in the read only memory 1007, are transferred into the random access memory 1012, which then contains the executable code of the program or programs, as well as registers for storing the variables and parameters necessary for implementing the invention.

In a preferred embodiment, the device is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding, into a bitstream, connectivity data describing connectivity between connected vertices of a 3D mesh model forming polygonal faces, the method comprising the following steps:
   successively traversing the vertices of the 3D mesh model;
   generating a command for each item of connectivity information not yet processed of each vertex currently traversed, thereby generating an ordered list of commands, wherein each command describes another vertex connected to the vertex currently traversed and is selected from a set of predefined commands having or not separate input parameters;
   encoding the generated commands with their separate input parameters, if any, into the bitstream,
   wherein encoding the generated commands with their separate input parameters, if any, includes:
   mapping each command of the ordered list onto a symbol, a mapping table associating commands with a set of respective symbols;
   encoding the resulting list of ordered symbols while keeping its order; and
   separately encoding the separate input parameters, if any, of the commands of the ordered list,
   wherein first combining commands intrinsically defining valence values are associated with respective symbol values equal to their intrinsically-defined valence values.

2. The method of claim 1, wherein commands not intrinsically defining valence values are associated with respective symbol values from the set of {0, 1, 2}.

3. The method of claim 1, wherein the set of predefined commands includes one or more first combining commands indicating when the other vertex connected to the vertex currently traversed is encountered for the first time and indicating the valence value of the other vertex.

4. The method of claim 3, wherein a plurality of first combining commands intrinsically indicates respective valence values without separate input parameters.

5. The method of claim 4, further comprising signalling, in the bitstream, a maximum valence value.

6. The method of claim 3, wherein each other vertex described by a first combining command is added to a current list of vertices, and the set of predefined commands further includes:
   a second command indicating when another vertex connected to a vertex currently traversed belongs to the current list, the second command driving a split of the current list into a current list and a secondary list, and
   a third command indicating when another vertex connected to a vertex currently traversed belongs to a secondary list, the third command driving a merger between the current list and the secondary list.

7. The method of claim 1, further comprising, prior to generating the ordered list of commands, adding at least one vertex to the 3D mesh model and defining new polygonal faces between the newly added vertex and other vertices of the 3D mesh model, in order to fill a hole in the 3D mesh model.

8. The method of claim 7, wherein the set of predefined commands further includes a newly-added-vertex command to indicate when the other vertex connected to the vertex currently traversed is such vertex added to the 3D mesh model to fill a hole.

9. The method of claim 8, wherein the newly-added-vertex command has a separate input parameter defining a valence value of the newly added vertex.

10. The method of claim 1, wherein encoding the ordered list of symbols includes jointly encoding two or more consecutive symbols in the ordered list of symbols using a single coding word.

11. The method of claim 10, wherein jointly encoding two or more consecutive symbols includes searching, in a look-up table, a coding word associated with the combination of the two or more symbols considered.

12. The method of claim 10, wherein encoding the ordered list of symbols further includes determining whether two or more consecutive symbols of the ordered list correspond to first combining commands which intrinsically define respective valence values that belong to a predefined reference range or not,
   wherein the two or more consecutive symbols are jointly encoded only in case of positive determining for the two or more consecutive symbols.

13. The method of claim 12, further comprising signalling, in the bitstream, one or two endpoints of the predefined reference range.

14. The method of claim 1, wherein separately encoding the separate input parameters of the commands includes:
grouping together the values taken by a separate input parameter in all occurrences of a given command in the ordered list, keeping the order of the ordered list of commands, and
encoding the group of values.

15. The method of claim 14, wherein separately encoding the separate input parameters of the commands includes independently encoding the values taken by two separate input parameters in all occurrences of a given command in the ordered list of commands.

16. The method of claim 1, further comprising signalling, in the bitstream, whether the ordered list of commands includes, in addition to first combining commands intrinsically defining valence values, other commands that do not intrinsically define valence values.

17. The method of claim 1, further comprising signalling, in the bitstream, whether the ordered list of commands includes, in addition to first combining commands intrinsically defining valence values, other commands that do not intrinsically define valence values,
wherein each other vertex described by a first combining command is added to a current list of vertices, and the set of predefined commands further includes a second command including when another vertex connected to a vertex currently traversed belongs to the current list, the second command driving a split of the current list into a current list and a secondary list, and a third command indicating when another vertex connected to a vertex currently traversed belongs to a secondary list, the third command driving a merger between the current list and the secondary list,
wherein the signalling step includes separately signalling whether the ordered list of commands includes at least one second command or includes at least one third command.

18. The method of claim 1, wherein the item of connectivity information includes an edge of a polygonal face, linking the vertex currently traversed to the other vertex.

19. A non-transitory computer-readable medium storing a program which, when executed by a microprocessor or computer system in a device, causes the device to perform the method of claim 1.

20. A method of decoding, from a bitstream, connectivity data describing connectivity between connected vertices of a 3D mesh model forming polygonal faces, the method comprising the following steps:
decoding the bitstream to obtain an ordered list of commands and associated separate input parameters, wherein each command describes another vertex connected to a vertex currently traversed,
executing each command of the obtained ordered list with associated separate input parameters if any, to generate a new item of connectivity information linking the other vertex to the vertex currently traversed,
building the 3D mesh model based on the generated connectivity information,
wherein decoding the bitstream includes:
decoding a list of ordered symbols from the bitstream;
separately decoding separate input parameters from the bitstream; and
mapping each symbol of the decoded list onto a command, a mapping table associating commands with a set of respective symbols.

21. The method of claim 20, further comprising, after building the 3D mesh model based on the generated connectivity information, removing at least one vertex from the built 3D mesh model and polygonal faces involving the removed added vertex, in order to restore a hole in the 3D mesh model.

22. The method of claim 20, wherein decoding a list of ordered symbols from the bitstream includes jointly decoding a single coding word from the bitstream into two or more consecutive symbols to add to the list of ordered symbols.

23. The method of claim 20, wherein the item of connectivity information includes an edge of a polygonal face, linking the vertex currently traversed to the other vertex.

24. A non-transitory computer-readable medium storing a program which, when executed by a microprocessor or computer system in a device, causes the device to perform the method of claim 20.

25. A device for encoding, into a bitstream, connectivity data describing connectivity between connected vertices of a 3D mesh model forming polygonal faces, the device comprising at least one microprocessor configured for carrying out steps of:
successively traversing the vertices of the 3D mesh model;
generating a command for each item of connectivity information not yet processed of each vertex currently traversed, thereby generating an ordered list of commands, wherein each command describes another vertex connected to the vertex currently traversed and is selected from a set of predefined commands having or not separate input parameters;
encoding the generated commands with their separate input parameters if any into the bitstream,
wherein encoding the generated commands with their separate input parameters if any includes:
mapping each command of the ordered list onto a symbol, a mapping table associating commands with a set of respective symbols;
encoding the resulting list of ordered symbols while keeping its order; and
separately encoding the separate input parameters, if any, of the commands of the ordered list,
wherein first combining commands intrinsically defining valence values are associated with respective symbol values equal to their intrinsically-defined valence values.

26. A device for decoding, from a bitstream, connectivity data describing connectivity between connected vertices of a 3D mesh model forming polygonal faces, the device comprising at least one microprocessor configured for carrying out steps of:
decoding the bitstream to obtain an ordered list of commands and associated separate input parameters, wherein each command describes another vertex connected to a vertex currently traversed,
executing each command of the obtained ordered list with associated separate input parameters if any, to generate a new item of connectivity information linking the other vertex to the vertex currently traversed,
building the 3D mesh model based on the generated connectivity information,
wherein decoding the bitstream includes:
decoding a list of ordered symbols from the bitstream;

separately decoding separate input parameters from the bitstream; and mapping each symbol of the decoded list onto a command, a mapping table associating commands with a set of respective symbols.

* * * * *